US012753652B2

(12) United States Patent
Till

(10) Patent No.: US 12,753,652 B2
(45) Date of Patent: Oct. 6, 2026

(54) CABINET DOOR AND METHOD

(71) Applicant: TAYLORCRAFT CABINET DOOR COMPANY, Taylor, TX (US)

(72) Inventor: Robert Heath Till, Georgetown, TX (US)

(73) Assignee: TAYLORCRAFT CABINET DOOR COMPANY, Taylor, TX (US)

( * ) Notice: Subject to any disclaimer, the term of this patent is extended or adjusted under 35 U.S.C. 154(b) by 152 days.

(21) Appl. No.: 18/737,835

(22) Filed: Jun. 7, 2024

(65) Prior Publication Data

US 2025/0027358 A1 Jan. 23, 2025

Related U.S. Application Data

(60) Provisional application No. 63/527,445, filed on Jul. 18, 2023.

(51) Int. Cl.
*E06B 3/72* (2006.01)
*E06B 3/70* (2006.01)
*E06B 3/74* (2006.01)

(52) U.S. Cl.
CPC ................ *E06B 3/721* (2013.01); *E06B 3/74* (2013.01); *E06B 2003/7061* (2013.01)

(58) Field of Classification Search
CPC .... E06B 3/721; E06B 3/74; E06B 2003/7061; E06B 3/7001; E06B 5/006
See application file for complete search history.

(56) References Cited

U.S. PATENT DOCUMENTS 2,457,964 A * 1/1949 Wyche ...................... E06B 3/74 217/17
3,184,802 A * 5/1965 Levy ......................... E06B 7/28 52/656.1
3,547,472 A * 12/1970 Ehrman ............ A47B 47/0041 403/381
4,512,125 A * 4/1985 Eriksson ............... E06B 3/5409 52/777
4,706,431 A * 11/1987 Corvese ................ E06B 3/7001 52/312
4,707,204 A * 11/1987 Heeg ..................... E06B 3/9643 144/368
4,783,945 A * 11/1988 Heeg ..................... E06B 3/9641 403/402
5,050,359 A * 9/1991 Lorge .................... E06B 3/9616 52/456

(Continued)

*Primary Examiner* — Rodney Mintz
(74) *Attorney, Agent, or Firm* — MARSHALL, GERSTEIN & BORUN LLP

(57) ABSTRACT

Cabinet doors and methods of making are disclosed. A cabinet door includes a panel having an outer face and an edge disposed along a perimeter of the panel, the outer face including a dado disposed along the edge. A pair of stiles, each stile having a length, a bottom surface, and a tongue extending from the bottom surface along the length of the stile and disposed in a portion of the dado are also included. The cabinet door further includes a pair of rails, each rail having a length, a bottom surface, and a tongue extending from the bottom surface along the length of the rail and disposed in a portion of the dado. At least one butt joint is formed where at least one rail abuts at least one stile. The bottom surfaces of the at least one stile and the at least one rail contact the outer face.

20 Claims, 8 Drawing Sheets

(56) References Cited

U.S. PATENT DOCUMENTS 5,317,853 A * 6/1994 Lopes ..................... E06B 5/006 52/456
5,718,082 A * 2/1998 Mori ................... E05B 15/0205 206/325
5,791,752 A * 8/1998 Hartman ................. G09F 15/00 52/509
6,487,827 B2 * 12/2002 Hollman ................ B27D 5/006 52/311.1
6,497,938 B1 * 12/2002 Hill ......................... B32B 21/06 52/409
6,546,691 B2 * 4/2003 Leopolder ............... E04F 15/02 52/592.1
7,143,561 B2 * 12/2006 Hollman ................ B27D 5/003 52/456
7,926,234 B2 * 4/2011 Pervan ..................... B27M 3/04 52/390
8,245,477 B2 * 8/2012 Pervan .................. E04F 15/087 52/592.1
8,413,401 B2 * 4/2013 Wang ....................... A47K 3/34 52/656.9
8,534,020 B2 * 9/2013 Burrows ................. E06B 5/006 52/656.1
8,763,334 B2 * 7/2014 O'Neill ................. E06B 3/7001 52/784.1
8,915,033 B2 * 12/2014 Daniels ................... C04B 28/14 52/232
9,080,372 B2 * 7/2015 Daniels ................... E04C 2/388
9,243,444 B2 * 1/2016 Daniels ................... E06B 5/164
9,375,899 B2 * 6/2016 Daniels ................... E06B 3/822
9,845,637 B1 * 12/2017 Albright ................. B32B 21/08
10,077,597 B2 * 9/2018 Daniels ................... B29C 39/10
10,352,094 B1 * 7/2019 Lopez-Isa .............. A47B 96/06
10,480,240 B2 * 11/2019 Toll ........................... E06B 1/52
10,900,278 B1 * 1/2021 Albright ............... E06B 3/7001
10,975,614 B1 * 4/2021 Albright ................. B32B 21/13
12,134,932 B2 * 11/2024 Albright ................. B32B 21/06
2002/0069611 A1 * 6/2002 Leopolder ............... E04F 15/02 52/590.3
2002/0083649 A1 * 7/2002 Hollman ............. B29C 63/0039 49/504
2004/0111993 A1 * 6/2004 Hollman ................ B27D 5/003 52/578
2005/0208255 A1 * 9/2005 Pervan .................. E04F 15/181 428/60
2005/0210797 A1 * 9/2005 Hees ......................... E06B 3/74 52/656.4
2006/0012274 A1 * 1/2006 Noll ...................... E06B 3/7001 312/246
2006/0048474 A1 * 3/2006 Pervan .................... E04F 15/02 52/589.1
2007/0039159 A1 * 2/2007 Galbreath ............... F16B 12/04 29/458
2007/0039270 A1 * 2/2007 Hollman ................ B27D 5/006 52/456
2012/0276319 A1 * 11/2012 O'Neill ..................... E06B 3/74 428/44
2013/0025232 A1 * 1/2013 Wang ....................... A47K 3/34 52/656.4
2013/0052388 A1 * 2/2013 Burrows ................... E06B 3/74 144/345
2014/0000194 A1 * 1/2014 Daniels ................... E06B 5/164 52/784.11
2014/0000195 A1 * 1/2014 Daniels ............... C04B 20/0068 52/784.11
2014/0000196 A1 * 1/2014 Daniels ..................... E06B 3/74 52/794.1
2014/0096471 A1 * 4/2014 Burrows ................... E06B 3/96 144/354
2015/0107172 A1 * 4/2015 Daniels ................... C04B 28/14 52/232
2015/0211271 A1 * 7/2015 Benhammou ........... E05B 17/10 292/251.5
2015/0335157 A1 * 11/2015 Slavin ..................... E06B 5/006 312/265.5
2016/0130861 A1 * 5/2016 Daniels ................... E06B 5/161 52/309.4
2017/0356235 A1 * 12/2017 Toll ........................... E06B 1/52
2021/0198940 A1 * 7/2021 Albright ................... B32B 3/08
2023/0248149 A1 * 8/2023 Soyk ....................... E06B 5/006 49/501
2025/0198231 A1 * 6/2025 Letafat ...................... E06B 3/74

* cited by examiner

CABINET DOOR AND METHOD

CROSS-REFERENCE TO RELATED APPLICATIONS

This application claims priority to and the filing date of provisional U.S. Patent Application No. 63/527,445 entitled "CABINET DOOR AND METHOD," filed on Jul. 18, 2023, the entire contents of which is hereby expressly incorporated herein by reference.

FIELD OF THE DISCLOSURE

The present disclosure relates generally to doors and, more particularly, to an improved cabinet door and method of making the same.

BACKGROUND

Conventional five-piece cabinet doors come in three basic varieties: (1) cope and stick; (2) mitered; and (3) lip molded. Cope and stick doors use a mortise and tenon joint to join stiles and rails to a panel of the door. Cope and stick is not used for designs having narrow width stiles and rails, at least because it is difficult to machine the mortise in the stiles and rails, for example. Mitered doors use mitered joints where the stiles meet the rails. But mitered joints open up and reveal a gap over time. Lip molding requires nails to fasten the stiles and rails to the panel. The nail holes require puttying and sanding, and the nails may hit door hardware.

SUMMARY

In accordance with a first exemplary aspect, a cabinet door comprises a panel having an outer face and an edge disposed along a perimeter of the panel, the outer face includes a dado disposed along the edge, a pair of stiles, each stile having a length, a bottom surface, and a tongue extending from the bottom surface along the length of the stile and disposed in a portion of the dado, a pair of rails, each rail having a length, a bottom surface, and a tongue extending from the bottom surface along the length of the rail and disposed in a portion of the dado. At least one butt joint is formed where at least one rail of the pair of rails abuts at least one stile of the pair of stiles. The bottom surface of at the least one stile and the bottom surface of the at least one rail contact the outer face.

In accordance with a second exemplary aspect, a cabinet door comprises a panel having an outer face and an edge, the outer face including a dado disposed along the edge, a pair of stiles, each stile having a length, a bottom surface, and a tongue extending from the bottom surface along the length of the stile and disposed in the dado, a pair of rails, each rail having a length, a bottom surface, and a tongue extending from the bottom surface along the length of the rail and disposed in the dado, and a band around an outer perimeter of the cabinet door. At least one butt joint is formed where at least one rail of the pair of rails abuts the at least one stile of the pair of stiles. The bottom surface of at the least one stile and the bottom surface of the at least one rail contact the outer face.

In accordance with a third exemplary aspect, a method of making a cabinet door comprises forming at least one dado along an edge of an outer face of a panel, forming a tongue extending from a bottom surface of at least one stile of a pair of stiles, forming a tongue extending from a bottom surface of at least one stile of a pair of rails, inserting the tongue of the at least one stile of the pair of stiles into the dado, positioning at least one rail of a pair of rails along the edge of the panel and between the pair of stiles by inserting the tongue of the at least one rail of the pair of rails into the dado, and forming at least one butt joint where the at least one rail abuts the at least one stile.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure, which are believed to be novel, are set forth with particularity in the appended claims. The present disclosure may be best understood by reference to the following description taken in conjunction with the accompanying drawings, in which like reference numerals identify like elements in the several figures, and in which:

Figure 1:
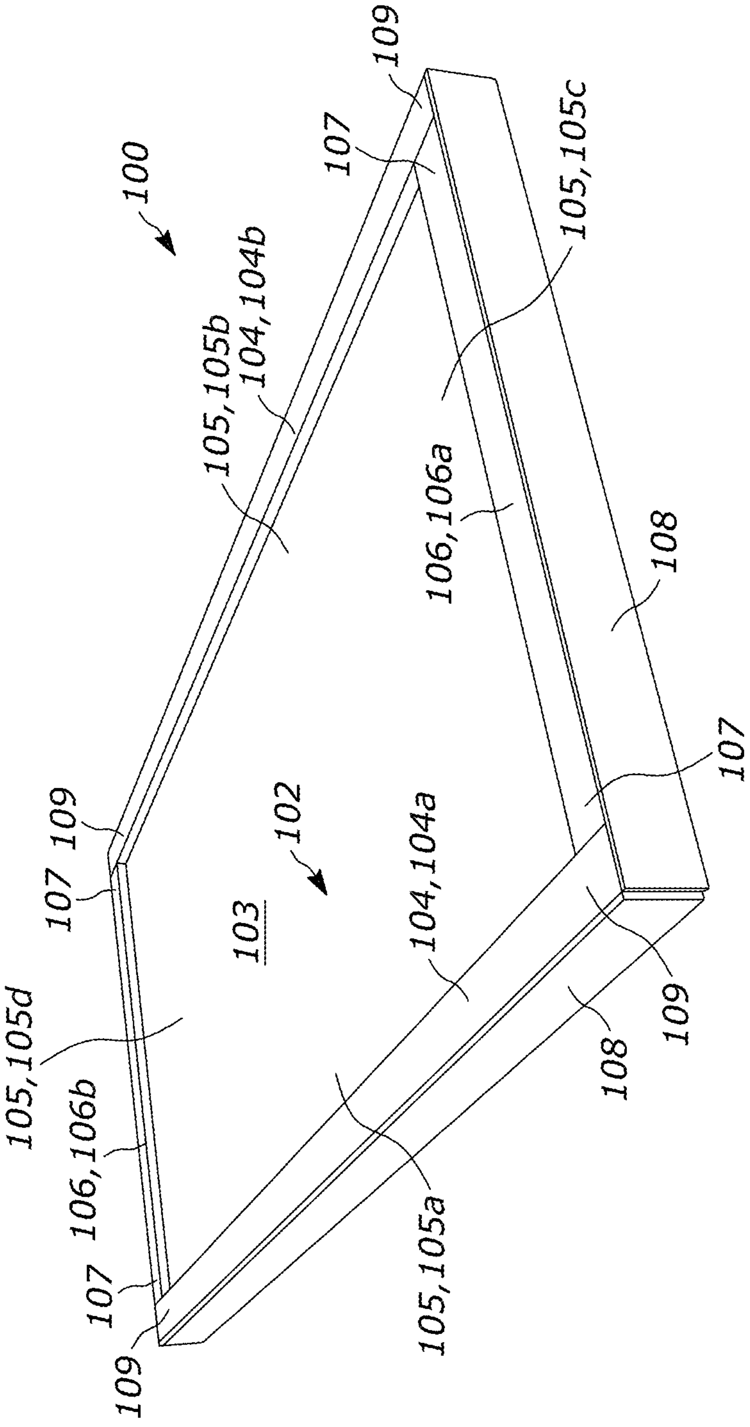
FIG. 1 illustrates a perspective view of an assembled cabinet door.

The figures depict embodiments of this disclosure for purposes of illustration only. One skilled in the art will readily recognize from the following discussion that alternate embodiments of the structures and methods illustrated herein may be employed without departing from the principles set forth herein. The figures are not to scale. Instead, they are drawn to clarify aspects of this disclosure. Connecting lines or connectors shown in the various figures presented are intended to represent example functional relationships, physical couplings, or logical couplings between the various elements. In general, the same reference numbers will be used throughout the drawing(s) and accompanying written description to refer to the same or like parts.

DETAILED DESCRIPTION

Referring to FIG. 1, a cabinet door 100 is illustrated. The cabinet door 100 may include a panel 102 having an outer face 103 and an edge 105 disposed along a perimeter P of the panel 102. In one example, the edge 105 includes several components, including first and second edges 105*a*, 105*b* and third and fourth edges 105*c*, 105*d* disposed between the first and second edges 105*a*, 105*b*. Along the first and second edges 105*a*, 105*b* on the outer face 103 of the panel 102, there is a pair of stiles 104, including a first stile 104*a* and a second stile 104*b*. In this example, the first and second stiles 104*a*, 104*b* have substantially the same length as the length of the panel 102. Along the third and fourth edges 105*c*, 105*d* on the outer face 103 of the panel 102, there is a pair of rails 106, including a first rail 106*a* and a second rail 106*b*, respectively. Ends 107 of the first and second rails 106*a*, 106*b* may contact ends 109 of the first and second stiles 104*a*, 104*b*. On the perimeter P of the cabinet door, there may be one or more bands 108. In this example, there is a single band 108, as explained more below in FIG. 4.

Figure 2A:
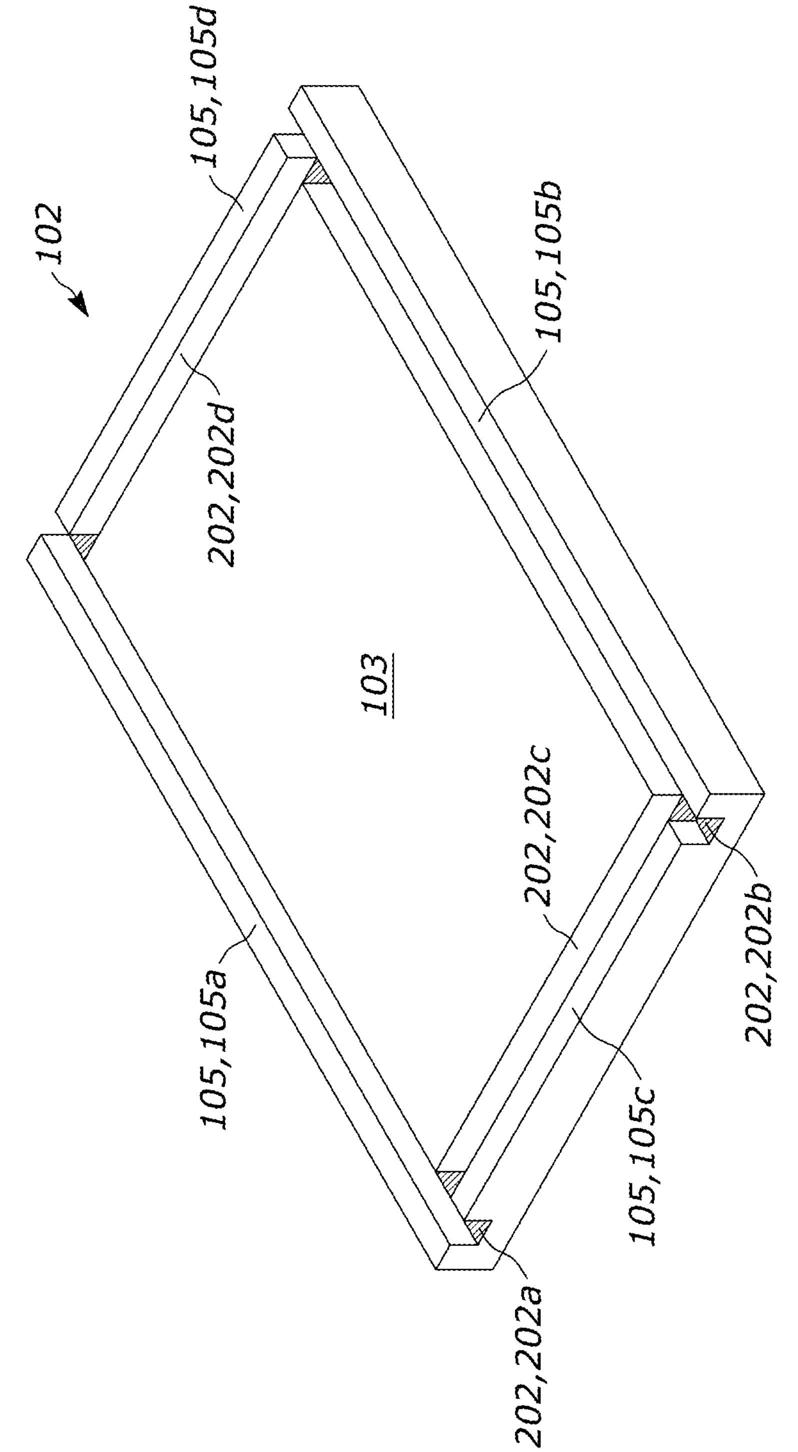
FIG. 2A illustrates a perspective view of a panel of the cabinet door of FIG. 1.
Figure 2B:
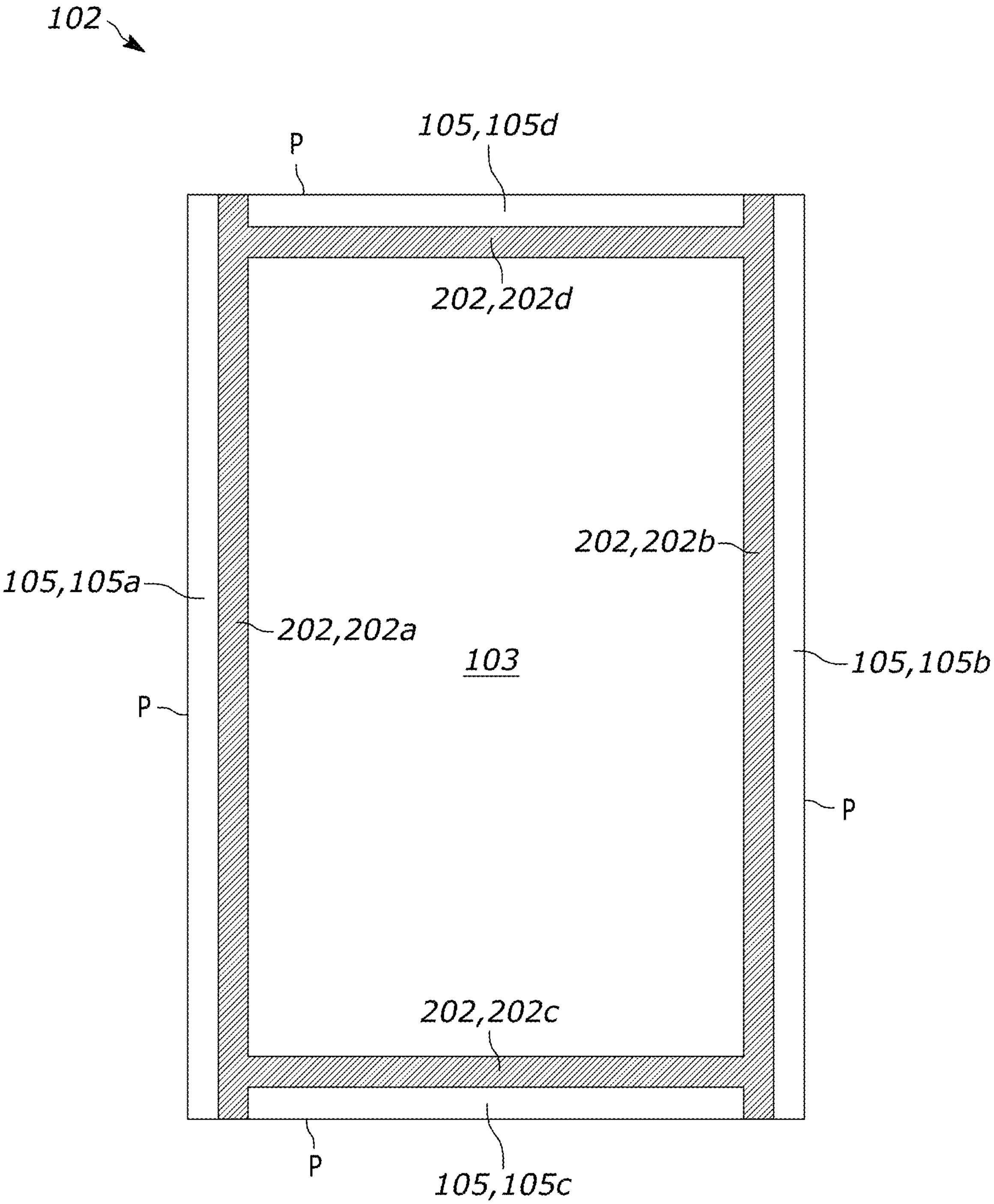
FIG. 2B illustrates a front view of the panel of FIG. 2A.
Figure 2C:
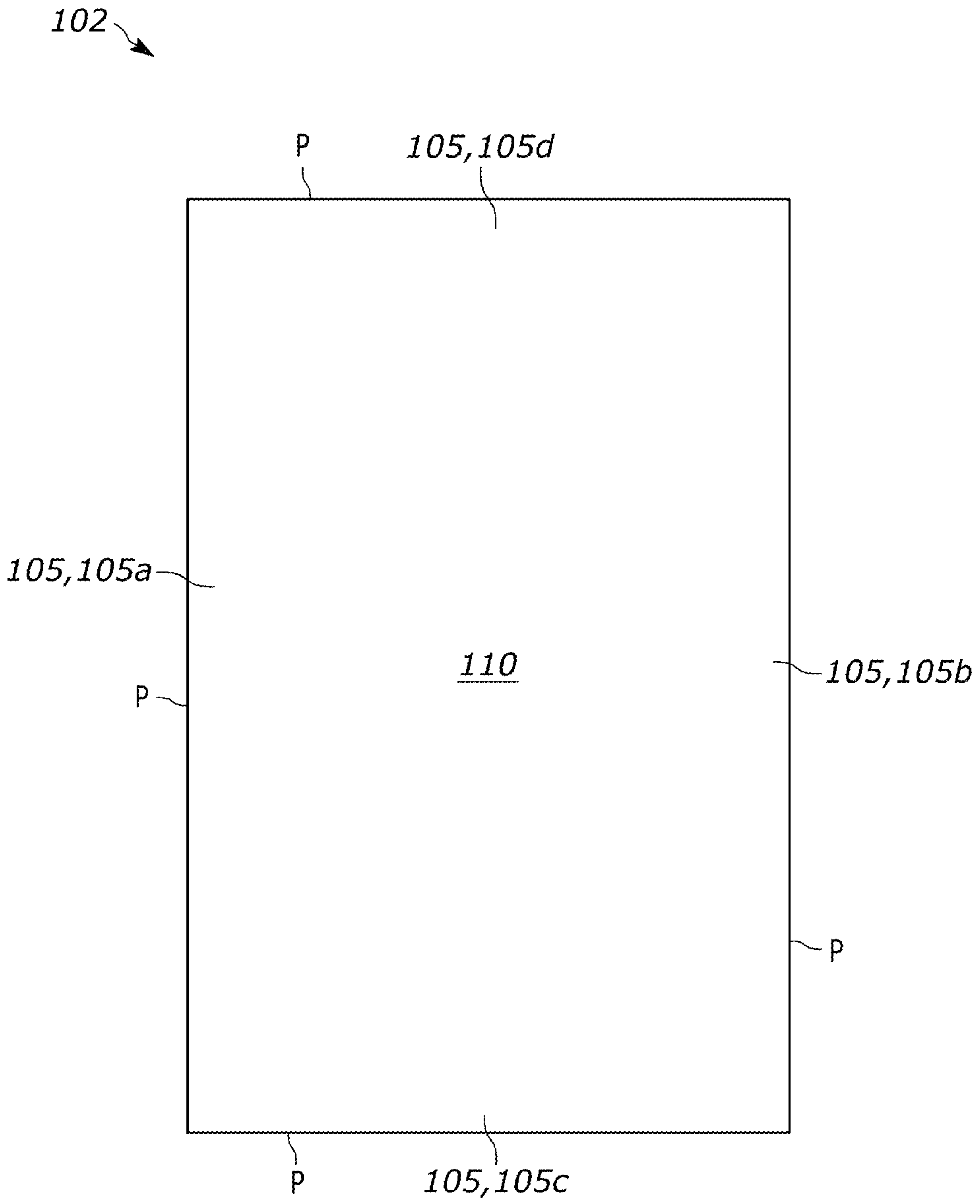
FIG. 2C illustrates a back view of the panel of FIG. 2A.

Referring now to FIGS. 2A, 2B, and 2C, the panel 102 is illustrated. The panel 102 may be composed of one or more of wood, medium density fiberboard, particle board, plywood, or other suitable materials. The panel 102 includes the outer face 103 (FIGS. 2A and 2B) and an inner face 110 (FIG. 2C). The panel 102 may have a thickness, measured from the outer face 103 to the inner face 110, of any value in the range of about 0.500 inches to about 0.625 inches, in one example. The outer face 103 of the panel 102 may include one or more dados 202. In one example, the dado 202 includes several components, including first and second dados 202*a*, 202*b* and third and fourth dados 202*c*, 202*d* disposed between the first and second edges 105*a*, 105*b*. Each dado 202 runs along the edge 105 disposed along and adjacent to the perimeter P of the panel 102. One or more dados 202 may be formed along each edge 105.

In one aspect, the dados 202 may be formed in the panel 102 by routing an outer face 103 of the panel 102. In another aspect, the dados 202 may be formed by the mold used to press the panel 102. The dados 202 may be through-dados or stopped dados. In one aspect, the dados 202*a* and 202*b* along the edges 105*a* and 105*b* of the panel 102 are through-dados that extend from the third edge 105*c* of the panel 102 to the opposite fourth edge 105*d* of the panel 102, and the dados 202*c* and 202*d* along the edges 105*c* and 105*d* of the panel 102 are stopped dados. In one example, the dados 202 may have a square or rectangular cross-section. It will be appreciated that the dados 202 may have various other shapes and/or cross-section configurations and still fall within the scope of the present disclosure. In one aspect, the dados 202 may have a depth of about 0.125, 0.250, 0.375, or 0.500 inches. In another aspect, the dados 202 may have a width of about 0.125, 0.250, 0.375, or 0.500 inches. It will be appreciated that the depths and widths of the dados 202 may include a value different from the examples described above and still fall within the scope of the present disclosure.

Figure 3:
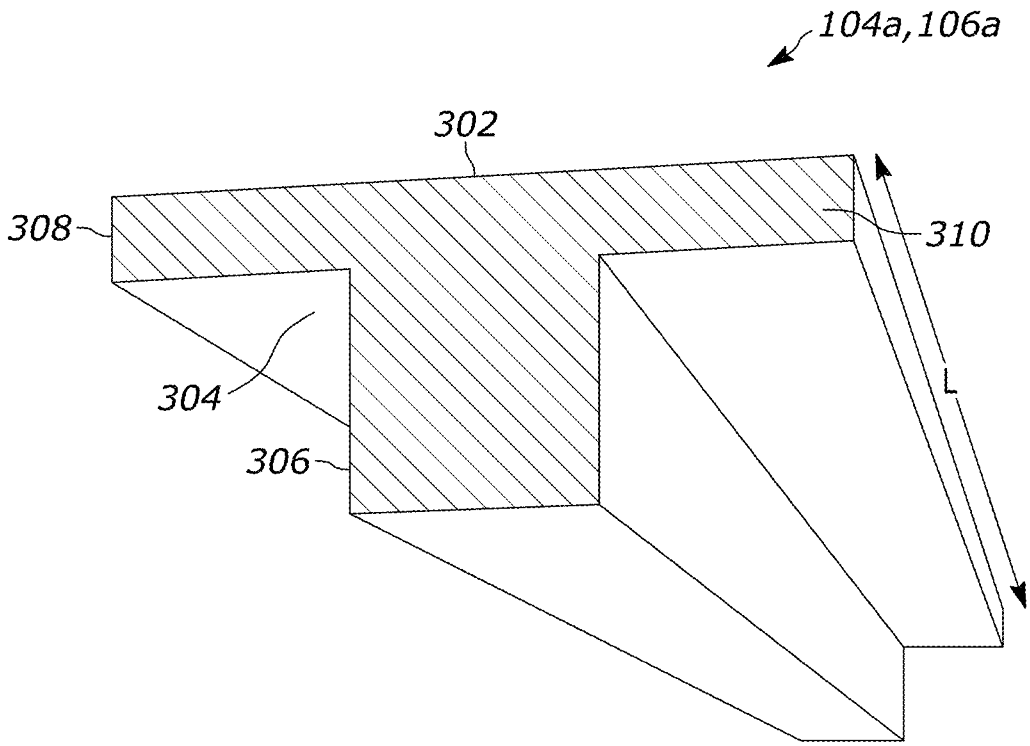
FIG. 3 illustrates a perspective view of a stile and a rail of the cabinet door of FIG. 1.

Referring to FIG. 3, the first stile 104*a* and the first rail 106*a* are illustrated. In this example, the first stile 104*a* and the first rail 106*a* include the same geometric configuration and dimensions, as explained more below. It will be appreciated that the stiles and rails may have dimensions and/or geometrical configurations different from each other and still fall within the scope of the present disclosure. The stile 104*a* and the rail 106*a* may be composed of one or more of wood, medium density fiberboard, particle board, polyurethane, polymer, or other suitable materials. In this example, the stile 104*a* has the same or similar cross-section and width as the rail 106*a*. The stile 104*a* and rail 106*a* each include a top surface 302, a bottom surface 304, and outer edge 308, and an inner edge 310. A thickness of the stile 104*a* and the rail 106*a* measured from the top surface 302 to the bottom surface 304 may be about 0.125 inches. It will again be appreciated that the thickness may be more or less than 0.125 inches and still fall within the scope of the present disclosure.

One or more tongues 306 may be disposed on and extend from the bottom surface 304 along the length L of the stile 104*a* and the rail 106*a*. So configured, the stile 104*a* and the rail 106*a* may have a generally t-shaped cross-section. It will be appreciated that cross-sections having other shapes may be used and still fall within the scope of the present disclosure. In one aspect, the tongue 306 may be formed by milling the stile 104*a* and rail 106*a*. In another aspect, the tongue 306 may be formed by the mold used to press the stile 104*a* and rail 106*a*. In another aspect, the tongue 306 may be affixed or joined to the bottom surface 304 using an adhesive. The tongue 306 may be configured to mate with the dados 202. The tongue 306 may have a square or rectangular cross-section. In one aspect, the tongue 306 may include a depth of about 0.125, 0.250, 0.375, or 0.500 inches. In another aspect, the tongues may include a width of about 0.125, 0.250, 0.375, or 0.500 inches. While FIG. 3 depicts the first stile 104*a* and the first rail 106*a*, the second stile 104*b* and the second rail 106*b* each have all the same features as the first stile 104*a* and the first rail 106*a* in this example.

Figure 4:
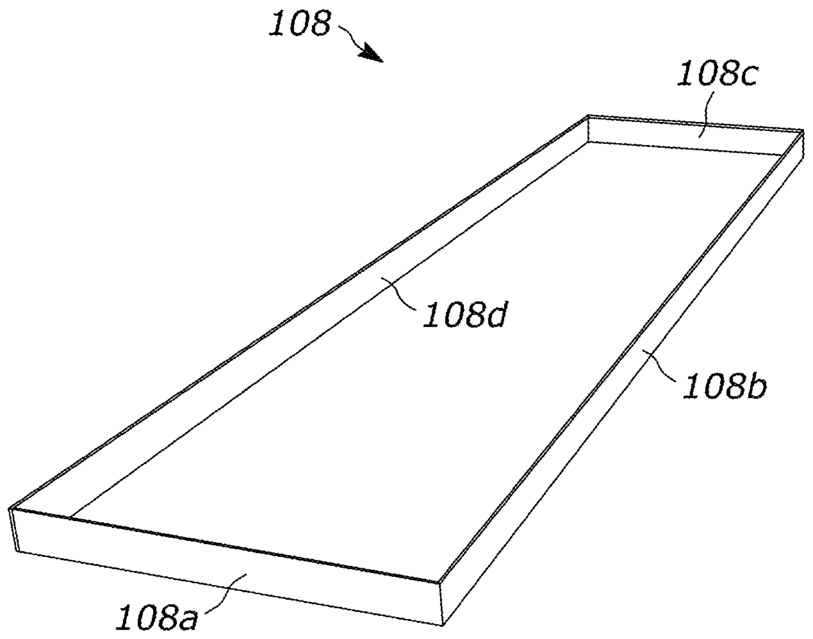
FIG. 4 illustrates a perspective view of a band of the door in FIG. 1.

Referring to FIG. 4, the band 108 is illustrated. The band 108 may be a thin strip of material configured to be applied around the perimeter P of the cabinet door 100. The band 108 may comprise one or more sections 108*a*, 108*b*, 108*c*, 108*d*. The band 108 may be composed of one or more of acrylic, wood veneer, melamine, laminate, or other suitable materials. The band 108 may be applied to the cabinet door 100 using an adhesive. The band 108 may hide the interfaces between the stiles 104 and the panel 102 and the interfaces between the rails 106 and the panel 102. The band 108 may assist in keeping the cabinet door 100 components aligned.

Figure 5:
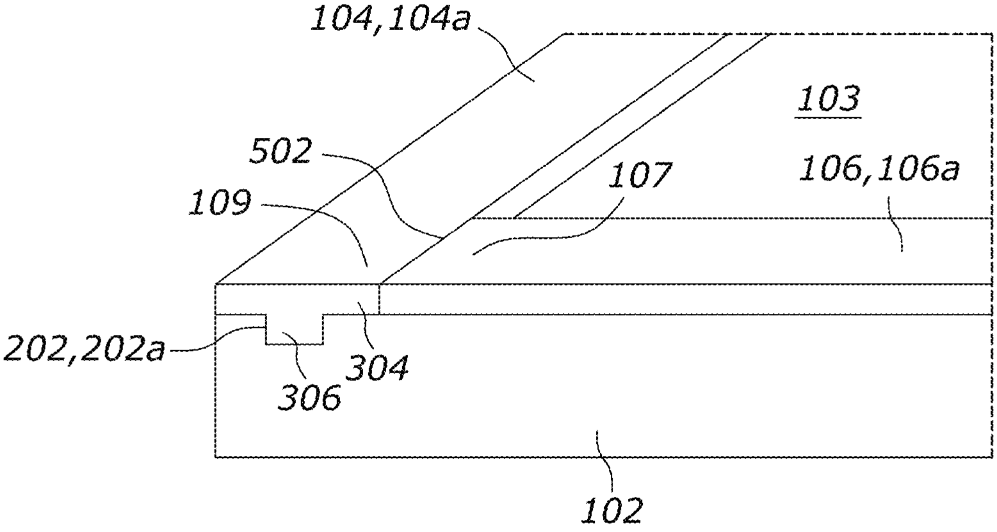
FIG. 5 illustrates a perspective view of a corner of the panel of FIG. 1.

Referring to FIG. 5, a portion of the panel 102 with the first stile 104*a* and the first rail 106*a* is illustrated without the band 108. The tongue 306 of the first stile 104*a* may be inserted into the dado 202*a*, and the bottom surface 304 of the first stile 104*a* may contact the outer face 103 of the panel 102. The tongue 306 of the first rail 106*a* may be inserted into the dado 202*c*, and the bottom surface 304 of the first rail 106*a* may contact the outer face 103 of the panel 102. An adhesive may be applied to the tongue 306, dados 202, bottom surfaces 304, and/or outer face 103 of the panel 102. The outer edges 308 of the stiles 104 and rails 106 may be substantially flush with the perimeter P of the panel 102. Where the ends 107 of the rails 106 meet the ends 109 of the stiles 104, a butt joint 502 may be formed. An adhesive may be applied to the ends 107 of the rails 106 to affix the ends 107 to the ends 109 of the stiles 104.

Figure 6:
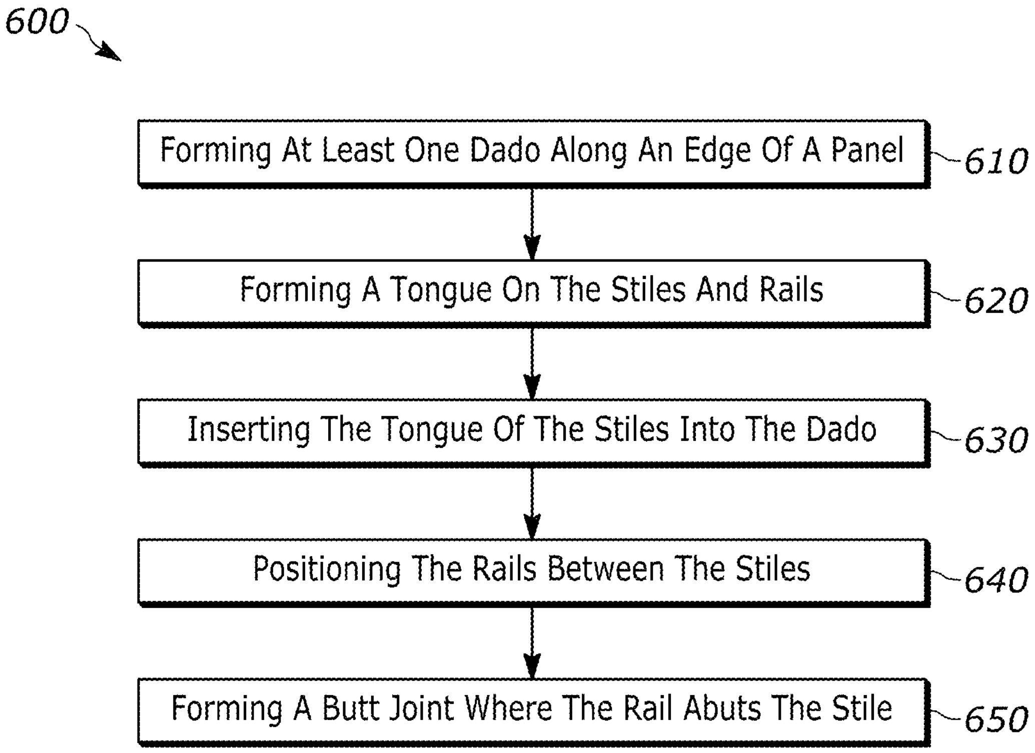
FIG. 6 is a flowchart illustrating steps for making a cabinet door.

FIG. 6 depicts a flow diagram for an exemplary method 600 for making a cabinet door. In one aspect, the method 600 may include at block 610 forming the at least one dado 202 along the edge 105 of the outer face 103 of the panel 102. The dado 202 may be formed by routing the outer face 103 of the panel 102 or by the mold used to press the panel 102. The dado 202 may comprise through-dados or stopped dados. The panel 102 may comprise one or more of wood, medium density fiberboard, particle board, or plywood.

In one aspect, the method 600 may include at block 620 forming the tongue 306 on at least one stile 104*a*, 104*b* of the pair of stiles 104 and at least one rail 106*a*, 106*b* of the pair of rails 106. Forming the tongue 306 may include milling the stiles 104*a*, 104*b* and rails 106*a*, 106*b*, forming the stiles 104*a*, 104*b* and the rails 106*a*, 106*b* in a mold, or attaching the tongue 306 to the bottom surface 304 of the stiles 104*a*,104*b* and the rails 106*a*, 106*b*. The stiles 104*a*, 104*b* and the rails 106*a*, 106*b* may comprise one or more of wood, medium density fiberboard, or particle board.

In one aspect, the method 600 may include at block 630 inserting the tongue 306 of the stiles 104*a*,104*b* into the dados 202. The method 600 may also include applying an adhesive to one or more of the bottom surface 304 of the stiles 104*a*, 104*b*, the tongue 306 of the stiles 104*a*, 104*b*, the outer face 103 of the panel 102, and the dado 202.

In one aspect, the method 600 may include at block 640 positioning the rails 106*a*, 106*b* between the stiles 104*a*, 104*b*. Positioning the rails 106*a*, 106*b* between the stiles 104*a*, 104*b* may include inserting the tongue 306 of the rails 106*a*, 106*b* into the dado 202. The method 600 may also include applying an adhesive to one or more of the bottom surface 304 of the rails 106*a*, 106*b*, the tongue 306 of the rails 106*a*, 106*b*, the outer face 103 of the panel 102, and the dado 202.

In one aspect, the method 600 may include at block 650 forming a butt joint 502 where the ends 107 of the rails 106*a*, 106*b* abut the ends 109 of the stiles 104*a*, 104*b*. The method 600 may also include applying an adhesive to the ends 107 of the rails 106*a*, 106*b*.

In one aspect, the method 600 may include applying the band 108 around the perimeter of the cabinet door 100 after forming the at least one butt joint 502.

In one aspect, a thickness of the cabinet door 100 measured from a top surface 302 of the stiles 104*a*, 104*b* or the rails 106*a*, 106*b* to an inner face 110 of the panel 102 is substantially about 0.625 to 0.750 inches.

It should be understood that not all blocks of the exemplary method 600 are required to be performed. Moreover, the exemplary method 600 is not mutually exclusive (i.e., block(s) from exemplary method 600 may be performed in any particular implementation).

In view of the foregoing, it will be understood the cabinet door 100 and related method 600 described above have at least the following advantages. The interlocking tongue-and-dado joints connecting the stiles 104*a*, 104*b* and the rails 106*a*, 106*b* to the panel 102 permit the stiles 104*a*, 104*b* and the rails 106*a*, 106*b* to be much thinner than conventional cope-and-stick joints. The butt joints 502 formed where the ends 107 of the rails 106*a*, 106*b* meet the ends 109 of the stiles 104*a*, 104*b* have several advantages over conventional mitered joints. Mitering the ends 107 and the ends 109 is more difficult than making straight cuts to form the ends 107 and ends 109. Butt joints are less likely to open up and reveal the joint over time versus mitered joints. And lip molded stiles and rails require nailing, puttying, and sanding. Misaligned nails can hit door hardware. On the other hand, the cabinet door 100 can be assembled and fastened with an adhesive instead of nails, eliminating the need for subsequent and time-consuming puttying and sanding. In addition, the inner face of the cabinet door 100 has no seams.

As used herein, the term "dado" may refer to one or more of a cut, a groove, or an indentation in a surface, including with the wood grain and/or across the wood grain in one example. It will be appreciated that the dado is not limited to these examples only and may have alternative, different and/or other features and still fall within the scope of present disclosure.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The communication systems and methods described herein are directed to improvements to computer and communication system functionality and performance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A cabinet door comprising:

a panel having an outer face and an edge disposed along a perimeter of the panel, the outer face including a dado disposed along the edge;

a pair of stiles, each stile having a length, a bottom surface, and a tongue extending from the bottom surface along the length of the stile and disposed in a portion of the dado; and a pair of rails, each rail having a length, a bottom surface, and a tongue extending from the bottom surface along the length of the rail and disposed in a portion of the dado, wherein at least one butt joint is formed where at least one rail of the pair of rails abuts at least one stile of the pair of stiles and the bottom surface of the at least one stile and the bottom surface of the at least one rail contact the outer face of the panel, and wherein a cross-section of the at least one stile is t-shaped and a cross-section of the at least one rail is t-shaped.

2. The cabinet door of claim 1, wherein an adhesive affixes each tongue to the dado.

3. The cabinet door of claim 1, wherein an adhesive affixes at least one end of the at least one rail to at least one end of the at least one stile to form the at least one butt joint.

4. The cabinet door of claim 1, wherein the at least one stile and the at least one rail comprise at least one of wood, medium density fiberboard, or particle board.

5. The cabinet door of claim 1, wherein the panel comprises at least one of wood, medium density fiberboard, particle board, or plywood.

6. The cabinet door of claim 1, wherein a thickness of the cabinet door measured from a top surface of the at least one stile to an inner face of the panel is substantially about 0.625 inches to about 0.750 inches.

7. The cabinet door of claim 1, wherein the dado comprises first and second dados extending from one edge of the panel to an opposite edge of the panel.

8. The cabinet door of claim 1, further comprising a band disposed around a perimeter of the cabinet door.

9. A cabinet door comprising:

a panel having an outer face and an edge, the outer face including a dado disposed along the edge;

a pair of stiles, each stile having a length, a bottom surface, and a tongue extending from the bottom surface along the length of the stile and disposed in the dado;

a pair of rails, each rail having a length, a bottom surface, and a tongue extending from the bottom surface along the length of the rail and disposed in the dado; and a band disposed around a perimeter of the cabinet door, wherein at least one butt joint is formed where at least one rail of the pair of rails abuts at least one stile of the pair of stiles and the bottom surface of the at least one stile and the bottom surface of the at least one rail contact the outer face of the panel.

10. The cabinet door of claim 9, wherein a cross-section of the at least one stile is t-shaped and a cross-section of the at least one rail is t-shaped.

11. The cabinet door of claim 9, wherein the dado comprises a through-dado.

12. The cabinet door of claim 9, wherein a thickness of the cabinet door measured from a top surface of the pair of stiles to an inner face of the panel is substantially about 0.625 inches to about 0.750 inches.

13. A method of making a cabinet door comprising:

forming at least one dado along an edge of an outer face of a panel;

forming a tongue extending from a bottom surface of at least one stile of a pair of stiles, a cross-section of the at least one stile being t-shaped;

forming a tongue extending from a bottom surface of at least one rail of a pair of rails, a cross-section of the at least one rail being t-shaped;

inserting the tongue of the at least one stile of the pair of stiles into the at least one dado;

positioning the at least one rail of the pair of rails along the edge of the panel and between the pair of stiles by inserting the tongue of the at least one rail of the pair of rails into the at least one dado; and forming at least one butt joint where the at least one rail abuts the at least one stile and the bottom surface of the at least one stile and the bottom surface of the at least one rail contact the outer face of the panel.

14. The method of claim 13, wherein inserting the tongue of the at least one stile of the pair of stiles into the dado comprises applying an adhesive to one or more of the bottom surface of the at least one stile, the tongue of the at least one stile, the outer face of the panel, and a portion of the at least one dado.

15. The method of claim 13, wherein positioning the at least one rail comprises applying an adhesive to one or more of the bottom surface of the at least one rail, the tongue of the at least one rail, the outer face of the panel, and the dado.

16. The method of claim 13, wherein forming the at least one butt joint where the at least one rail abuts the at least one stile comprises applying an adhesive to ends of the at least one rail.

17. The method of claim 13, wherein forming the at least one dado comprises routing the dado in the outer face.

18. The method of claim 13, wherein forming the at least one dado comprises pressing the panel in a mold.

19. The method of claim 13, wherein forming the tongue extending from the bottom surface of the at least one stile of the pair of stiles comprises milling the at least one stile, and forming the tongue extending from the bottom surface of the at least one rail of the pair of rails comprises milling the at least one rail.

20. The method of claim 13, further comprising applying a band around an outer perimeter of the cabinet door after forming the at least one butt joint.

* * * * *